United States Patent
Ghosh et al.

(10) Patent No.: US 10,346,158 B2
(45) Date of Patent: Jul. 9, 2019

(54) APPLICATION MANAGEMENT PLATFORM

(71) Applicant: Accenture Global Solutions Limited, Dublin (IE)

(72) Inventors: Apratim Ghosh, Hyderabad (IN); Ramkumar Kothandaraman, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 29 days.

(21) Appl. No.: 15/469,015

(22) Filed: Mar. 24, 2017

(65) Prior Publication Data

US 2018/0275986 A1 Sep. 27, 2018

(51) Int. Cl.
| | |
|---|---|
| G06F 8/70 | (2018.01) |
| G06F 11/36 | (2006.01) |
| G06F 8/60 | (2018.01) |
| G06F 8/77 | (2018.01) |
| G06F 11/34 | (2006.01) |
| G06F 8/71 | (2018.01) |

(52) U.S. Cl.
CPC .............. *G06F 8/70* (2013.01); *G06F 8/60* (2013.01); *G06F 8/71* (2013.01); *G06F 8/77* (2013.01); *G06F 11/3438* (2013.01); *G06F 11/3664* (2013.01); *G06F 11/3668* (2013.01)

(58) Field of Classification Search
None
See application file for complete search history.

(56) References Cited

U.S. PATENT DOCUMENTS

| | | | | |
|---|---|---|---|---|
| 2012/0036494 | A1* | 2/2012 | Gurumohan | G06Q 10/103 717/106 |
| 2012/0036552 | A1* | 2/2012 | Dare | H04L 41/0253 726/1 |
| 2014/0195670 | A1* | 7/2014 | Jain | H04L 41/069 709/224 |
| 2014/0324779 | A1* | 10/2014 | Forbes | G06F 17/30575 707/634 |
| 2016/0004848 | A1* | 1/2016 | Gocek | G06F 21/105 726/26 |
| 2017/0046246 | A1* | 2/2017 | Kaulgud | G06F 11/3612 |

* cited by examiner

*Primary Examiner* — Francisco J Aponte
*Assistant Examiner* — Mark A Gooray
(74) *Attorney, Agent, or Firm* — Fish & Richardson P.C.

(57) ABSTRACT

An integrated application management platform manages applications, such as mobile apps, during various stages in their lifecycle, such as development, testing, deployment, usage by end-users, maintenance, and/or retirement of the applications. The platform integrates the management of various aspects and elements of the lifecycle of multiple applications. The platform may include a dashboard with any suitable number of screens to enable monitoring of the portfolio of applications in the various stages of their lifecycles. The platform may also provide automation to manage the applications during the various stages of their lifecycle. The platform facilitates managing a portfolio of applications by managing and presenting information regarding application deployment status, deployment status, testing status, security aspects (e.g., device management, user authentication, rights management), analytics for user adoption and application usage, proactive monitoring for user feedback and/or application failures, user feedback, upgrades and hotfixes, and/or release management.

18 Claims, 9 Drawing Sheets

APPLICATION MANAGEMENT PLATFORM

BACKGROUND

Traditionally, application development involves multiple distinct phases that are separate with respect to the personnel involved in the different phases, the budgets and/or timelines for the different phases, and the issues that are addressed during the different phases. For example, during a design phase, an application designer may confer with clients and/or end-users to identify the features and general user experience to be provided, and create a high-level design of the application. During a development phase, an architect may determine an architecture that provides the overall technical structure of an application, and developers may write code to implement the various features within the architecture. During a testing phase, quality engineers and/or developers may test the application for functional correctness, performance, usability, and/or other aspects. Developers may correct the issues identified during testing, and the development and testing process may continue iteratively until the application is in a state that is suitable for release to end-users. After release, the designers, architectures, developers, testers, and/or others involved in creating the application may move onto different projects, and may not maintain visibility into the application. Bug reports received from end-users may be handled by support engineers, who may not have been involved in the creation of the application. Discrete sets of tools may be used in the different stages, such as a code editor and debugger suite during the development stage, issue tracking software during the maintenance stage, and so forth This traditional paradigm for an application lifecycle may be suitable for managing development of desktop software applications, but mobile application development and management poses additional challenges that may not be adequately handled using the traditional paradigm. For example, mobile application development may involve a larger number of releases, and more frequent releases, than traditional desktop application development.

SUMMARY

Implementations of the present disclosure are generally directed to managing applications deployed to computing devices. More specifically, implementations are directed to an integrated platform that manages the development and/or deployment of applications, such as mobile applications that include multiple flavors and/or versions, and that monitors the usage and performance of the deployed applications.

In general, innovative aspects of the subject matter described in this specification can be embodied in methods that includes actions of: receiving, from a deployment manager, an indication of an application to be managed through an integrated application management platform that manages a plurality of applications; sending an instruction from the integrated application management platform to instruct the deployment manager to provide the application for deployment to one or more end-user computing devices; receiving, through the integrated application management platform, deployment data from the deployment manager, the deployment data describing the deployment of the application to at least one of the one or more end-user computing devices; receiving, through the integrated application management platform, usage data generated on the one or more end-user computing devices, the usage data describing usage of the application executing on the one or more end-user computing devices; receiving, through the integrated application management platform, performance data generated on the one or more end-user computing devices, the performance data describing performance of the application executing on the one or more end-user computing devices; and presenting, in a dashboard of the integrated application management platform, an integrated display of the deployment data, the usage data, and the performance data received regarding the application.

Implementations can optionally include one or more of the following features: the plurality of applications includes one or more mobile applications; the one or more end-user computing devices include one or more portable computing devices; the actions further include receiving, through the integrated application management platform, feedback information generated on at least one of the one or more end-user computing devices, the feedback information including end-user feedback regarding the application; the actions further include presenting the feedback information in the dashboard; the actions further include sending at least a portion of the feedback information from the integrated application management platform to instruct a service management tool to add an issue ticket to track actions to address the end-user feedback; the actions further include receiving, through the integrated application management platform, failure information generated on at least one of the one or more end-user computing devices, the failure information indicating a failure of the application executing on the at least one of one or more end-user computing devices; the actions further include presenting the failure information in the dashboard; the actions further include sending at least a portion of the failure information from the integrated application management platform to instruct a service management tool to add an issue ticket to track actions taken to correct the failure of the application; the deployment manager indicates that a test build of the application has been generated by a build server in communication with the deployment manager; the integrated application management platform instructs the deployment manager to provide the test build of the application for testing on the one or more end-user computing devices; the actions further include receiving, from the deployment manager, an indication that testing of the test build is complete; the actions further include sending an instruction from the integrated application management platform to instruct the deployment manager to provide the test build of the application to a product environment for deployment to the one or more end-user computing devices; the usage data describes one or more of a number of end-user devices to which the application has been deployed, a number of executions of the application on the end-user devices, one or more features of the application accessed during its execution on the end-user devices, or one or more navigation paths followed to access the one or more features; the performance data describes one or more of a call frequency exhibited by the application during its execution on one or more end-user devices, an error frequency exhibited by the application during its execution, an average response time exhibited by the application during its execution, or a performance metric indicating an overall performance of the application during its execution; the integrated application management platform manages a plurality of flavors of the application, each of the plurality of flavors targeting a respective operating system (OS); the integrated application management platform manages, for each of the plurality of flavors, a plurality of versions of the application; the dashboard further presents portfolio management information describing the plurality of flavors and the plurality of version of the application managed through the integrated application management platform; and/or one or more of the deployment data, the usage data, or the performance data are received and presented in real time in the dashboard.

Other implementations of any of the above aspects include corresponding systems, apparatus, and computer programs that are configured to perform the actions of the methods, encoded on computer storage devices. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

Implementations of the present disclosure provide one or more of the following advantages. By providing an integrated platform for application management, which provides a combined presentation of development status information, build status information, deployment information, user feedback, runtime performance data, issue resolution tracking, and/or other aspects for one or more applications, implementation avoid the traditional scenario in which different types of information may be presented in separately executing tools. Accordingly, implementations make more efficient use of computing resources, such as processing capacity, active memory, storage space, and/or network capacity, compared to traditional solutions that execute a larger number of processes. Moreover, given the rapid development-test-release iteration present in mobile app development and management, the integrated management platform described herein also facilitates the tracking of a large number of different versions and/or flavors of a potentially large number of apps. Traditional solutions (e.g., intended for managing desktop applications) may not be as well-suited for tracking mobile apps, and may not have the capacity to handle the large number of versions, flavors, and apps to be managed.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Figure 1:
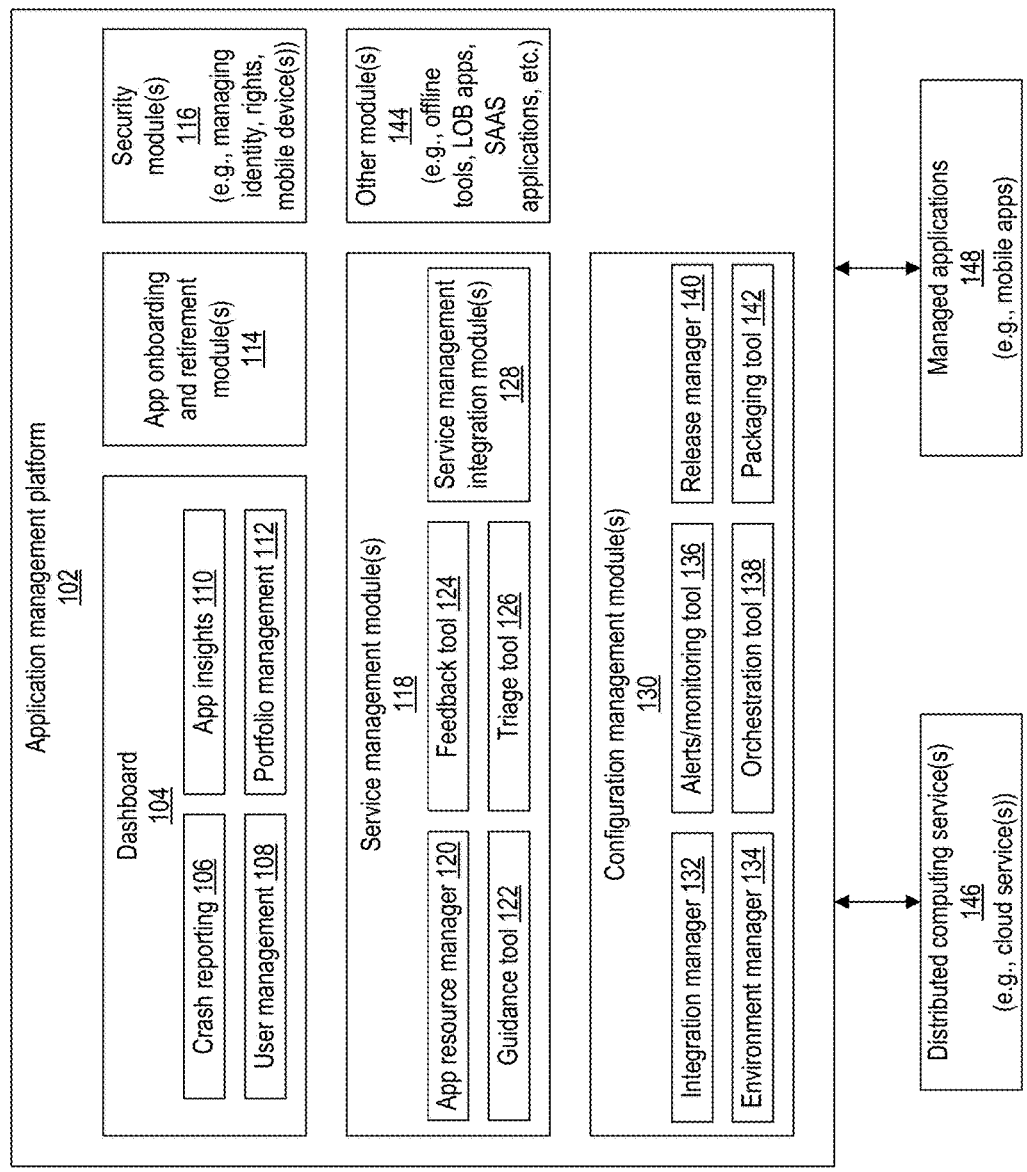
FIG. 1 depicts an application management platform, according to implementations of the present disclosure.

Implementations of the present disclosure are directed to an integrated application management platform, also described herein as the platform, that manages applications during various stages in their lifecycle, such as development, testing, deployment, usage by end-users, maintenance, and/or retirement of the applications. The platform integrates the management of various aspects and elements of the lifecycle of multiple applications to facilitate management of a portfolio of applications. In some examples, the managed portfolio of applications may include mobile applications that execute on mobile, or portable, computing devices such as smartphones, tablet computers, wearable computer, portable gaming platforms, and so forth. Applications may also be described as apps.

In some implementations, the platform includes a dashboard, e.g., a user interface (UI), that includes any suitable number of screens to enable a user to monitor the portfolio of applications in the various stages of the lifecycle of each application. The platform may also provide automation to manage the applications during the various stages of their lifecycle. The platform may assist an organization in managing a portfolio of applications, by providing the following: consistent lifecycle management at various stages, including product deployment; a consolidated view of the currently deployed applications, applications under development and/or test, and related services; end-to-end security including device management, user authentication, and/or rights management; in-depth analytics for user adoption and application usage; proactive monitoring for user feedback, application crashes, and/or other issues; integration of tools for tracking, managing, and/or addressing user feedback, crashes, and/or other issues; and/or managing upgrades and hotfixes, and release management.

In many cases, traditional solutions for application portfolio management and/or application lifecycle management are unsuitable for managing mobile apps, given that a mobile app portfolio may include a large number of apps, with each app include multiple flavors each configured to execute on a particular mobile operating system (OS). Moreover, each flavor may have multiple versions that are currently installed on end-user computing devices or various stages of development and/or testing. Accordingly, a large number of versions of each particular app, of a potentially large number of apps, may be present in a portfolio in various stages of development and/or deployment, leading to challenges for an organization attempting to keep track of all the versions of all the apps. Moreover, given a potential large number of downloads of different versions of different apps to end-user devices, it may be difficult, using traditional solutions, to know how many end-users are actually using the app, which features of the app(s) are being used, how the end-users are navigating through different sections of the app(s), and so forth. Traditional solutions may also be inadequate for handling security aspects of a large number of mobile apps, such as identity/authentication issues, rights management, mobile device management, and so forth.

The application management platform, accordingly to the implementations described herein, addressed these shortcomings in traditional solutions by provided an integrated platform for monitoring and managing multiple apps, with multiple flavors and versions, throughout the various lifecycles of development and deployment. The platform integrates issue tracking and management for the various apps in a portfolio. The platform also receives and presents real time information regarding app usage, performance, failures (e.g., crashes), and/or other information, to provide a holistic view into the health of the various apps in a portfolio of apps. The platform provides a single dashboard UI, with multiple screens, to present information regarding the apps in a portfolio.

FIG. 1 depicts an application management platform 102, according to implementations of the present disclosure. The application management platform 102 is also referred to as the platform 102. The platform 102 may execute on any appropriate number and type of computing devices. In some implementations, the various components of the platform 102 (described below) execute on a same computing device or cluster of computing devices. Alternatively, different components may execute on different computing devices.

As shown in the example of FIG. 1, the application management platform 102 includes a dashboard 104. The dashboard 104 is a UI that may include any appropriate number of screens, in any suitable layout, for presenting the information received from the various components of the platform 102. For example, the dashboard 104 may be a web interface (e.g., a web site) that is available on an organizational intranet, and that presents information through a web browser or other container for presenting web content. In some implementations, the dashboard 104 includes screen(s) for crash reporting 106, to present information regarding crashes (e.g., failures) or other issues exhibited by deployed apps executing on end-user device(s). The dashboard 104 may include screen(s) for user management 108, to enable an operator of the platform 102 (e.g., a developer) to manage the users who are authorized to access the dashboard 104. Such management may include adding user(s), removing user(s), changing user permission levels, and so forth. The dashboard 104 may include screen(s) for app insights 110, to present information regarding the performance and/or usage of apps as described below. The dashboard 104 may also include screen(s) for portfolio management 112, to present information regarding the various apps, in various flavors and/or versions, that are currently present in a portfolio, either in development or deployed to end-user device(s). The dashboard 104 may also include other appropriate types of screen(s). Example screens provided by the dashboard 104 are described further with reference to FIGS. 4-8.

In some implementations, the platform 102 includes one or more app onboarding and retirement modules 114. The module(s) 114 may perform operations to add new apps, or new flavors and/or versions of current apps, to the portfolio for management through the platform 102. The module(s) 114 may also perform operations to retire (e.g., remove) apps from the portfolio, or to retire app flavor(s) and/or version(s), such that the retired apps, flavors, and/or versions are no longer managed through the platform 102.

In some implementations, the platform 102 includes one or more security modules 116 that perform security-related operations within the platform. Such operations may include verifying the identity of users (e.g., authenticating users) who are authorized to access the dashboard 104 and/or other module(s) of the platform 102. The operations may also include rights management operations for the managed apps, and/or mobile device management.

The platform 102 may also include one or more service management module(s) 118. The module(s) 118 may include an app resource manager 120, a guidance tool 122, a feedback tool 124, a triage tool 126, and/or one or more service management integration module(s) 128. The feedback tool 124 may collect feedback provided by end-users regarding the apps executing on end-user device(s). Such feedback may be provided through help and/or support features of the apps themselves, through an app store, or through other channels.

In some implementations, the platform 102 may include one or more configuration management modules 130, such as an integration manager 132, an environment manager 134, an alerts and/or monitoring tool 136, and orchestration tool 138, a release manager 140, and/or a packaging tool 142. The integration manager 132 may provide for (e.g., continuous and/or ongoing) integration of the various subsystems of the platform 102. The alerts and/or monitoring tool 136 handle the various alerts received from apps, regarding crashes or other types of problems, as well as monitoring the apps for usage and/or performance information to be presented through the dashboard 104. The release manager 140 manages releases of the various apps to end-user device(s), e.g., in a test environment or a production environment as described further below. The packaging tool 142 packages apps for release.

The platform 102 may also include other module(s) 144 to facilitate other aspects of the integrated app portfolio management. For example, the other module(s) 144 may include tools and/or assets such as offline tools, LOB apps, software as a service (SAAS) applications, and so forth.

In some implementations, the platform 102 may interact with distributed computing service(s) 146 (e.g., cloud computing service(s)) to perform various operations. In some implementations, the platform 102 may itself execute as a cloud service within a distributed computing environment The platform 102 may interact with any appropriate number of applications 148 (also described as apps), to manage and/or monitor the applications 148 through various stages of the app lifecycle. Such management and/or monitoring is described further with reference to FIG. 2.

Figure 2:
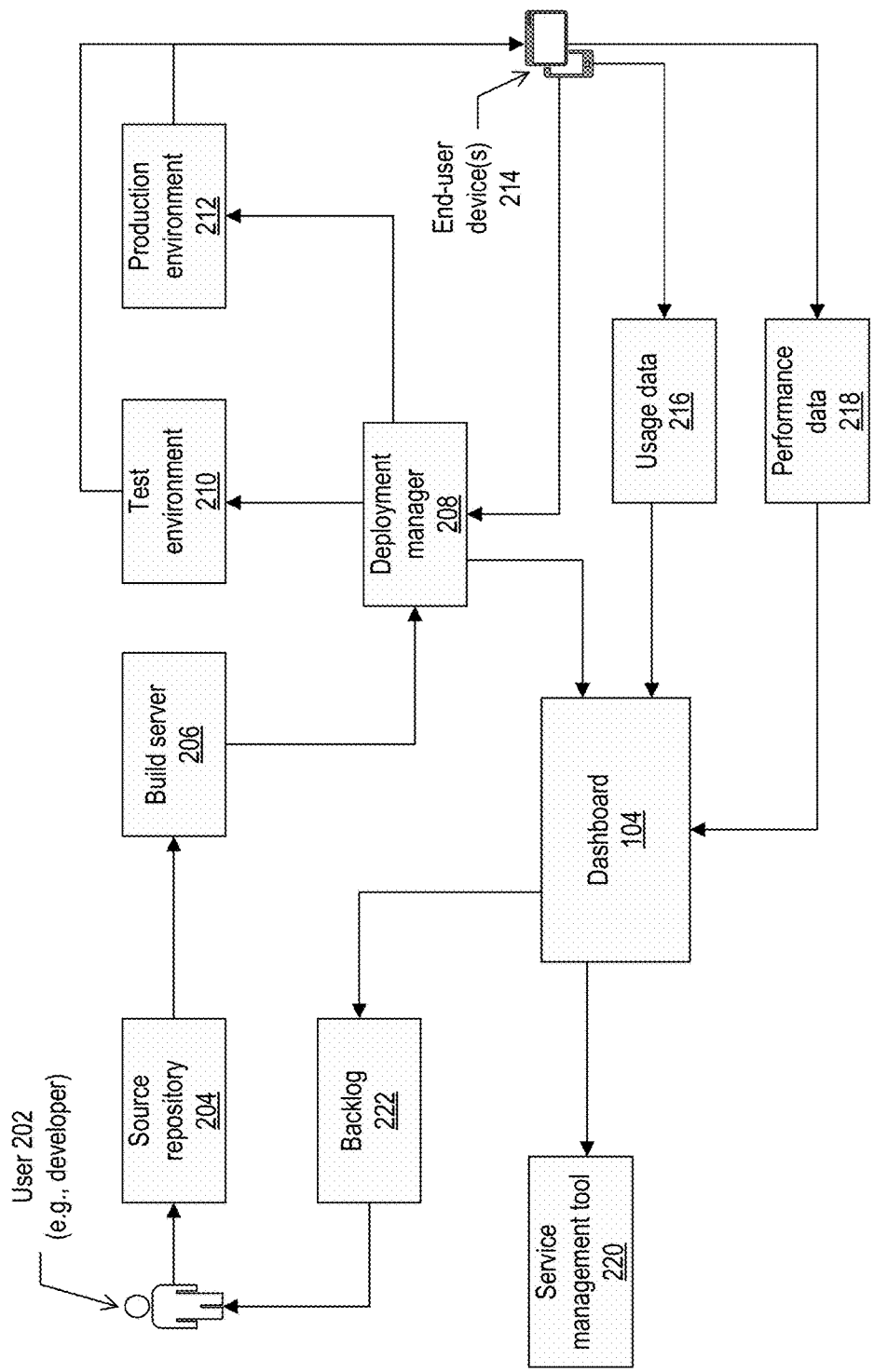
FIG. 2 depicts a flow diagram of an example process for managing applications through the application management platform, according to implementations of the present disclosure.

FIG. 2 depicts a flow diagram of an example process for managing applications through the application management platform 102, according to implementations of the present disclosure. As shown in the example of FIG. 2, a user 202 may interact with the dashboard 104 other components of the platform 102, and/or other software module(s) in communication with the platform 102. The software components shown in FIG. 2, such as the source repository 204, the build server 206, the deployment manager 208, and/or the service management tool, may be component(s) of the platform 102. Alternatively, such software component(s) may be external to the platform 102, and may communicate with the platform 102 over one or more network(s).

The user 202 may be a developer involved in the creation of the apps managed through the platform 102. Alternatively, the user 202 may have some other role in the app lifecycle, such as a manager, project manager, team lead, architect, designer, user experience designer, quality engineer, tester, build manager, deployment manager, support specialist, customer service representative, or other role.

The user 202 may interact with a source repository 204. For example, a user 202 may write source code for the app(s), and such source code may be checked into the source repository 204. The source repository may provide source control features for tracking changes made to the code by various users, maintaining different source code trees for various builds of the app(s), storing the code securely in data storage, and so forth. The user 202 can interact with the source repository 204 to create a new project for onboarding an app into the platform 102, for developing new app or for onboarding an existing app (e.g., developed elsewhere) to be managed through the platform 102.

A build server 206 may retrieve source code from the source repository 204, and use the source code (e.g., along with build scripts, makefiles, libraries, and/or other files) to build the app(s). The build server 206 may publish the build of an app to the deployment manager 208 for release to the test environment 210 and/or production environment 212. A build of an app (e.g., a particular flavor and/or version of an app) is an executable file that is configured to execute on an end-user computing device, such as a mobile device. An app may be built, and deployed, in one or more flavors, where each flavor of an app is built and/or configured to execute on a particular OS (e.g., mobile OS). For example, an app may be built in different flavors that each executes on a particular version of Microsoft Windows™, Apple iOS™, Google Android™, and so forth. A flavor of an app may be released in one or more versions. In some instances, different versions may implement different features of an app, or may implement the same features somewhat differently. In some instances, a later version of an app may correct defects such as bugs, performance issues, usability problems, and so forth that were present in a previous version of the app.

The build(s) of the various apps(s) may be accessed by the deployment manager 208. The deployment manager 208 may manage the deployment of a new build of an app to a test environment 210 or a production environment 212. In some implementations, the deployment manager 208 may be a version of HockeyApp™. In instances where, the new build of an app is a build of a new version of an app that was previously available in at least one older version, the deployment manager 208 may automatically inform end-users (e.g., beta test users and/or production version end-users) that a new version of the app is available for deployment to their end-user device(s) 214, and provide the new version for deployment to end-user device(s) 214. In some instances, the deployment manager 208 provides automated version management and release management for the test environment 210 and/or production environment 212.

A build of an app may be placed in the test environment 210 after the build has been approved for testing. Testing may include beta testing, in which a test build of the app is deployed to beta tester end-user device(s) 214. Testing may also include other types of testing on other types of end-user device(s) 214, such as a dedicated test environment. In some instances, after testing is complete such that the build is in a suitable state of quality for release to production, the build may be placed in the production environment 212.

Version(s) of the apps may be deployed to one or more end-user device(s) 214, such as mobile device(s) (e.g., smartphones, tablet computers, wearable computers, and so forth). In some implementations, the app(s) may monitor user activities performed through the app(s), and may provide usage data 216 describing those activities. Usage data 216 may describe the particular features and/or portions of the app being used by an end-user. The usage data 216 may also describe the particular paths that an end-user follows to navigate between features and/or portions of the app, such as an order in which the end-user accesses different features. The app(s) may also collect and provide performance data 218 describing how the app(s) perform under different conditions. Performance data 218 may include information regarding load, response time, network communications, call frequency (e.g., calls per minute), average response time for calls, error frequency (e.g., errors per minute), active memory usage, hard drive accesses, processing capacity used, and so forth. The usage data 216 and/or performance data 218 may be provided by the end-user device(s) 214 to the platform 102 as live, real time data, which is presented in the dashboard 104.

In some implementations, the end-user device(s) 214 may also communicate crash (e.g., failure) and/or feedback information to the deployment manager 208. The crash information may describe crashes of the app(s) running on the end-user device(s) 214, and the feedback information may include end-user-provided feedback regarding the app(s). The crash and/or feedback information may be provided, as live, real time data, from the deployment manager 208 to the platform 102 for presentation in the dashboard 104. Real time data describes data that is received shortly after it is generated. Such data may be communicated, received, and/or presented immediately following its generation on the end-user devices, accounting for the intervening time spent to communicate the data over network(s) and/or process the data by one or more intermediary processes (e.g., the deployment manager) and/or devices. Real time data may be presented shortly after it is generated by the end-user devices and received by the platform 102, without additional delay.

The dashboard 104 may provide an integrated view of an app portfolio, including the various flavors and/or versions of one or more apps that are in development or testing, and/or that have been deployed to the end-user device(s) 214. The dashboard 104 may present the usage data 216, performance data 218, and/or crash and feedback information that has been received regarding each of the various app(s) that are executing on the end-user device(s) 214. In some implementations, the dashboard 104 may provide functionality to enable crash and/or feedback information to be added (e.g., as issue tickets, bug reports, etc.) to the service management tool 220. The service management tool 220 may provide a view of various issues that are open regarding a build of an app, and a status of the resolution of the issues. The service management tool 220 may also present information regarding old, already resolved (e.g., closed) issues. In some implementations, the dashboard 104 may include functionality to enable certain issues (e.g., tickets, bug reports, etc.) to be escalated to a backlog 222 to be analyzed and addressed by user(s) 202. The analysis of such issues may lead to code check-ins into the source repository to fix problems in an app, and such check-ins may lead to a build of a new version for the app. This cycle may iterate any appropriate number of times to provide new (e.g., improved) builds of an app.

Figure 3:
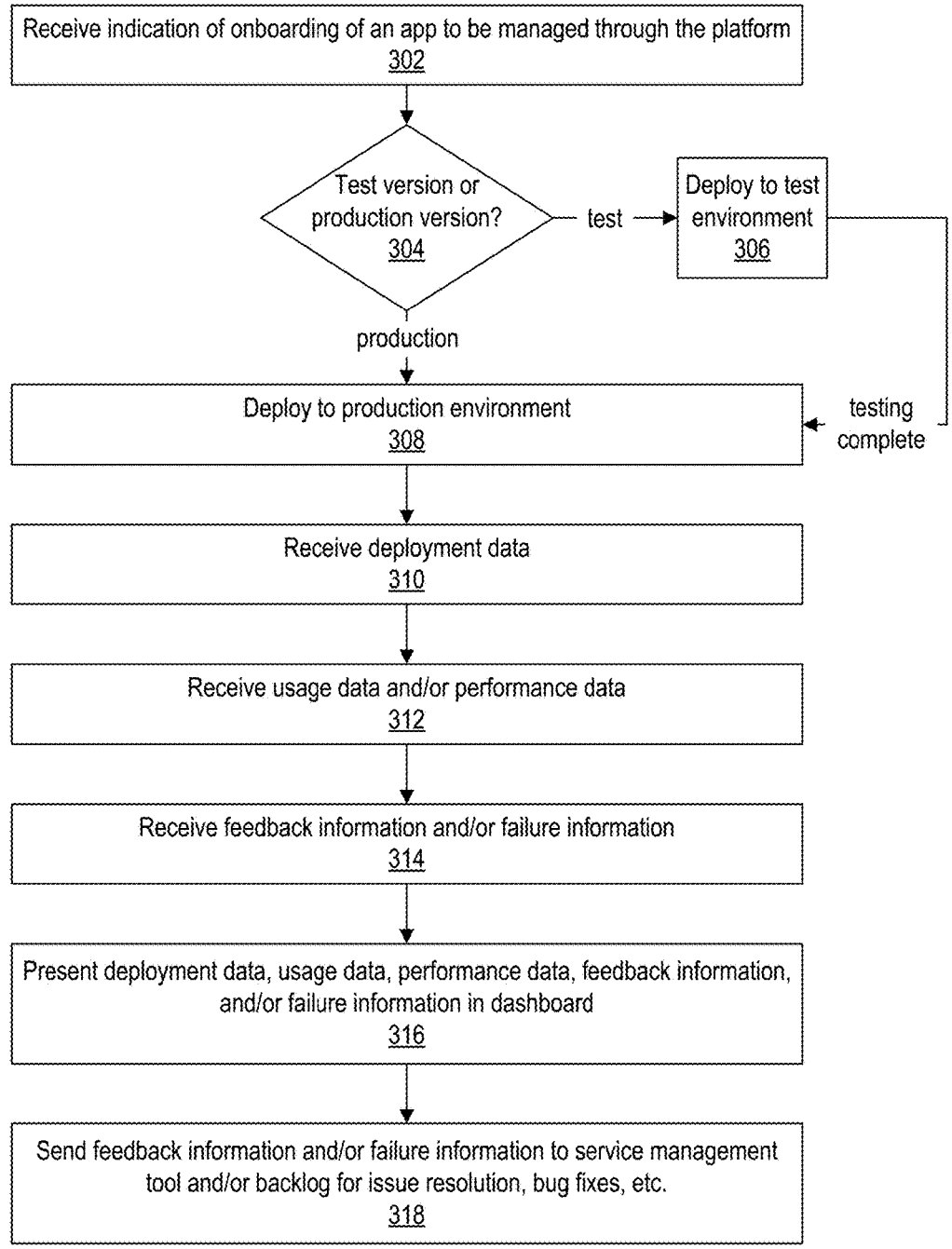
FIG. 3 depicts a flow diagram of an example process for managing applications through the application management platform, according to implementations of the present disclosure.

FIG. 3 depicts a flow diagram of an example process for managing applications through the application management platform 102, according to implementations of the present disclosure. Operations of the process may be performed by one or more of the components of the platform 102 as described with reference to FIG. 1, and/or other software components executing on one or more computing devices.

An indication may be received (302) of an app (e.g., a particular flavor and/or version of an app) that is to be managed through the platform 102. Adding a new app, or a new flavor and/or version of an app, to the platform 102 is described as onboarding. In some implementations, the indication may be received from the deployment manager

208, as an indication that a build of the app has been generated by the build server 206 based on code checked into the source repository 204. Onboarding may include the discovery of new apps to be managed through the platform 102, and/or the rationalization of existing apps. Onboarding may also cause the automatic provisioning of the app in the source repository and/or other systems that are components of the platform 102 or external to the platform 102. Onboarding may initiate a process to setup the continuous build and release management for the app, e.g., through the build server and/or deployment manager, as well as the presentation of information describing the onboarded app in the dashboard 104.

A determination may be made (304) whether the received version of the app is a test version (e.g., for beta testing or other types of testing) or a production version (e.g., for release to end-users who are not testers). If it is a test version, the build may be deployed to a test environment (306) for testing on certain end-user devices that are designated as test devices (e.g., beta test devices or otherwise). If it is a production version, the build may be deployed to a production environment (308) to be deployed to non-test end-user devices. After testing is complete in the testing environment, e.g., after the app has been approved for deployment to the product environment, the build may be deployed to the production environment.

In some implementations, deployment data is received (310) from the deployment manager or some other service. The deployment data may describe the number of end-user devices where the app has been installed. The deployment data may also describe the particular flavor and/or version of the app installed on various end-user devices.

Usage data and/or performance data may also be received (312) as described above. The usage data may describe one or more of the following: a number of end-user devices to which the app has been deployed, a number of executions of the app on the end-user devices (e.g., how often the app is actually being used), the particular features of the app being accessed during its execution on the end-user devices, and/or the particular navigation paths followed to access the various features. In general, the usage data may describe the behavior of the end-users using the app.

The performance data may describe one or more of the following: a call frequency exhibited by the app during its execution on one or more end-user devices, an error frequency exhibited by the app during its execution, an average response time exhibited by the app during its execution, and/or a performance metric indicating an overall performance of the app during its execution. In general, the performance data may describe the performance of the app during its execution on the end-user devices.

In some implementations, feedback information and/or failure information may be received (314). As described above, such information may be received through the deployment manager, in some implementations. Alternatively, the information may be received from the end-user devices (e.g., directly), without passing through the deployment manager.

The deployment data, usage data, performance data, feedback information, and/or failure information may be presented (316) through the dashboard 104 of the platform 102, as described further with reference to FIGS. 4-8.

In some instances, the feedback information and/or failure information may be sent (318) to the service management tool and/or backlog, to initiate an issue resolution process which may lead to an updated build of the app being created as described above.

Usage data, performance data, feedback information, failure information, and/or deployment information regarding the test build of the app may also be received while the app is being tested in the test environment. In such instances, the received information may be employed in the testing of the app and may be used to determine if the app is ready for deployment to the production environment.

FIGS. 4-8 depict example screens of the dashboard 104 provided by the platform 102. Although the example screens show particular UI elements arranged in a particular configuration, implementation are not limited to the particular elements and arrangement shown. The screens may present elements in the form of information and/or controls of any suitable type, in any appropriate size, position, orientation, and/or arrangement. Moreover, the dashboard 104 is not limited to presenting information visually, and may also provide audio and/or haptic data presentation as appropriate. The screens may present text data, images, video data, graphics, and/or other types of information.

Figure 4:
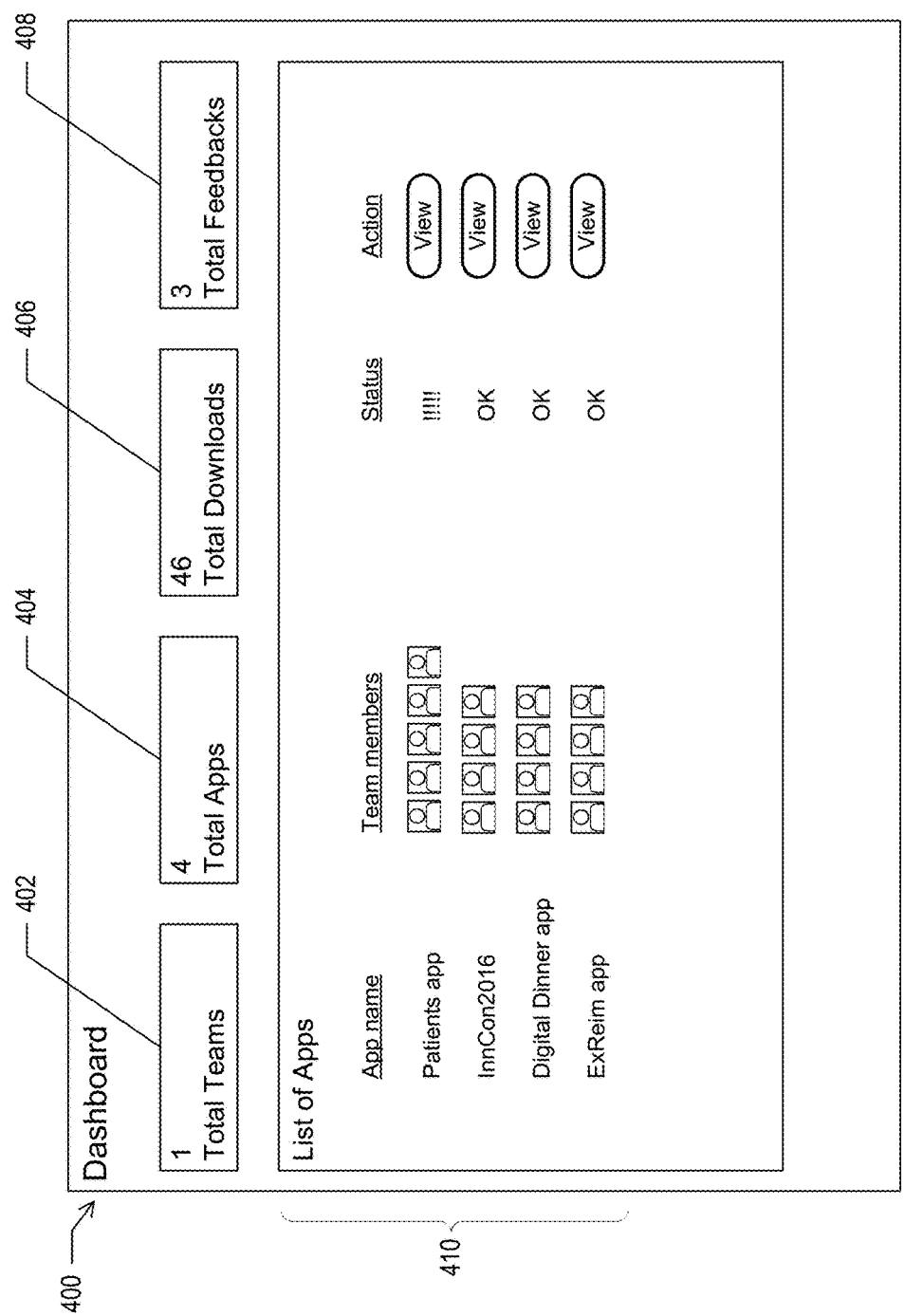
FIGS. 4-8 depict example user interfaces for managing applications through the application management platform, according to implementations of the present disclosure.

FIG. 4 depicts an example of a top-level screen 400 for the dashboard 104. In this example, the screen 400 includes elements to present information regarding the total number of teams 402 present in the app management/development environment, the total number of apps 404 being managed through the platform 102, the total number of downloads 406 of deployed apps being monitored through the platform 102, and the total number of feedbacks 408 received from end-users regarding the deployed apps. The screen 400 also includes a list 410 of the apps that are being managed through the platform 102. The list 410 may include, for each managed app, the app name, the team members working on the app, the status of the app, and action(s) that may be taken through the dashboard 104 with respect to the app. The status may indicate whether any of the particular flavors and/or versions of the app are exhibiting problems, such as crashes, performance issues, reported bugs, and so forth. The action(s) may be context-dependent. For example, for an app that is in test, an available action may be to move that app to production. In the example shown, each app has a possible action to view more details regarding the app.

Figure 5:
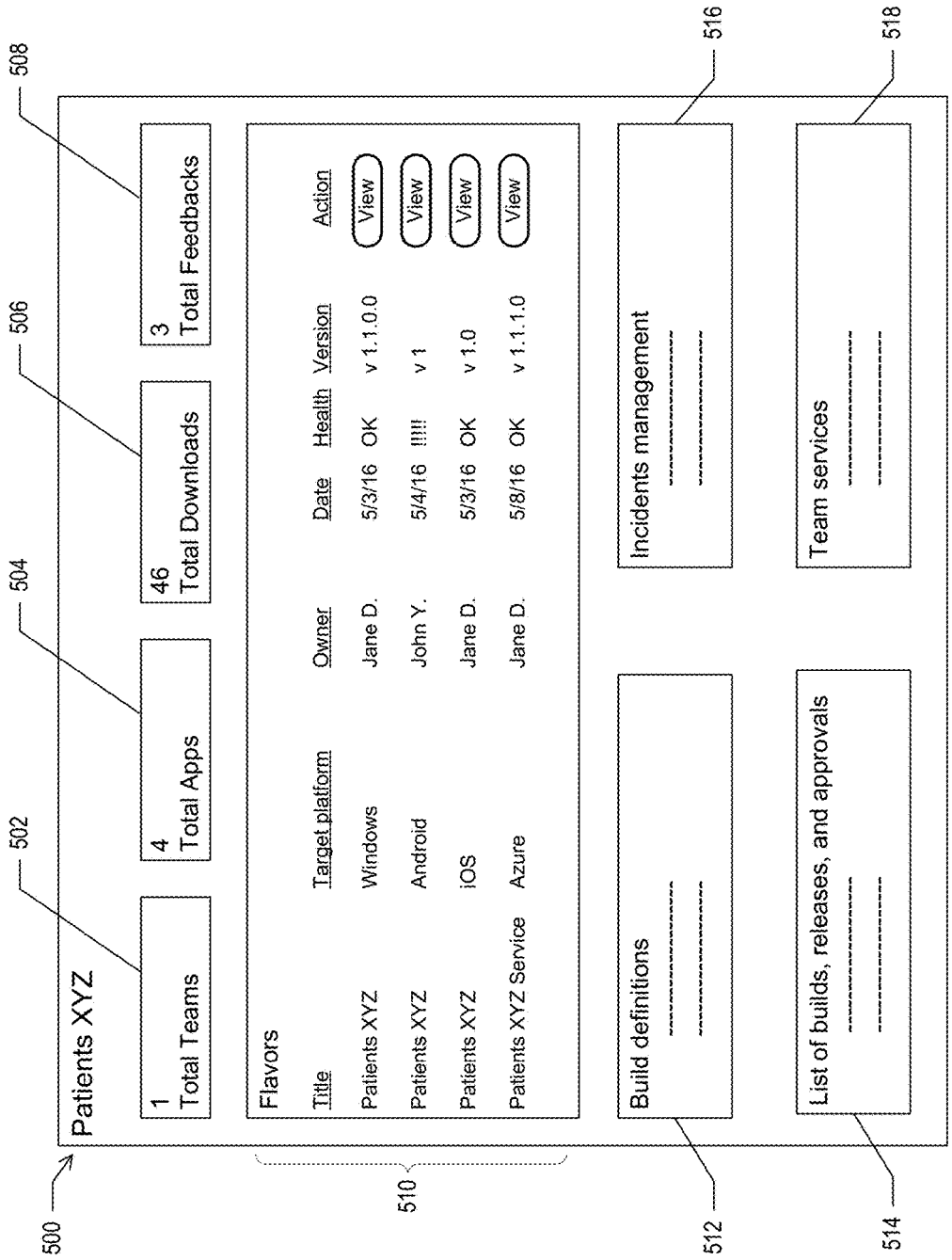

On detecting a user selection of a particular app for which to view more information, the dashboard 104 may present a screen 500 as shown in the example of FIG. 5. In this example, the screen 500 includes elements to present information regarding the total number of teams 502 present in the app management/development environment, the total number of apps 504 being managed through the platform 102, the total number of downloads 506 of deployed apps being monitored through the platform 102, and the total number of feedbacks 508 received from end-users regarding the deployed apps.

The screen 500 also includes a list 510 of the flavors of the app that are being managed through the platform 102. The list 510 may include, for each managed flavor, the target platform (e.g., OS), the team member who is the owner of the flavor, the release and/or build date for the most recent version of the flavor, the health of the flavor, the most recent version of the flavor, and action(s) that may be taken through the dashboard 104 with respect to the flavor. The health may indicate whether any of the versions of the flavor, or the most recent version of the flavor, are exhibiting problems, such as crashes, performance issues, reported bugs, and so forth. As in FIG. 4, the displayed action(s) may be context-dependent. In the example shown, each flavor has a possible action to view more details regarding the flavor.

The screen 500 may also present information describing build definitions 512, list of builds, releases, and approvals 514, incidents management 516, and team services 518. Clicking on each of these may cause the dashboard 104 to present more detail regarding each of these aspects for the particular app.

Figure 6:
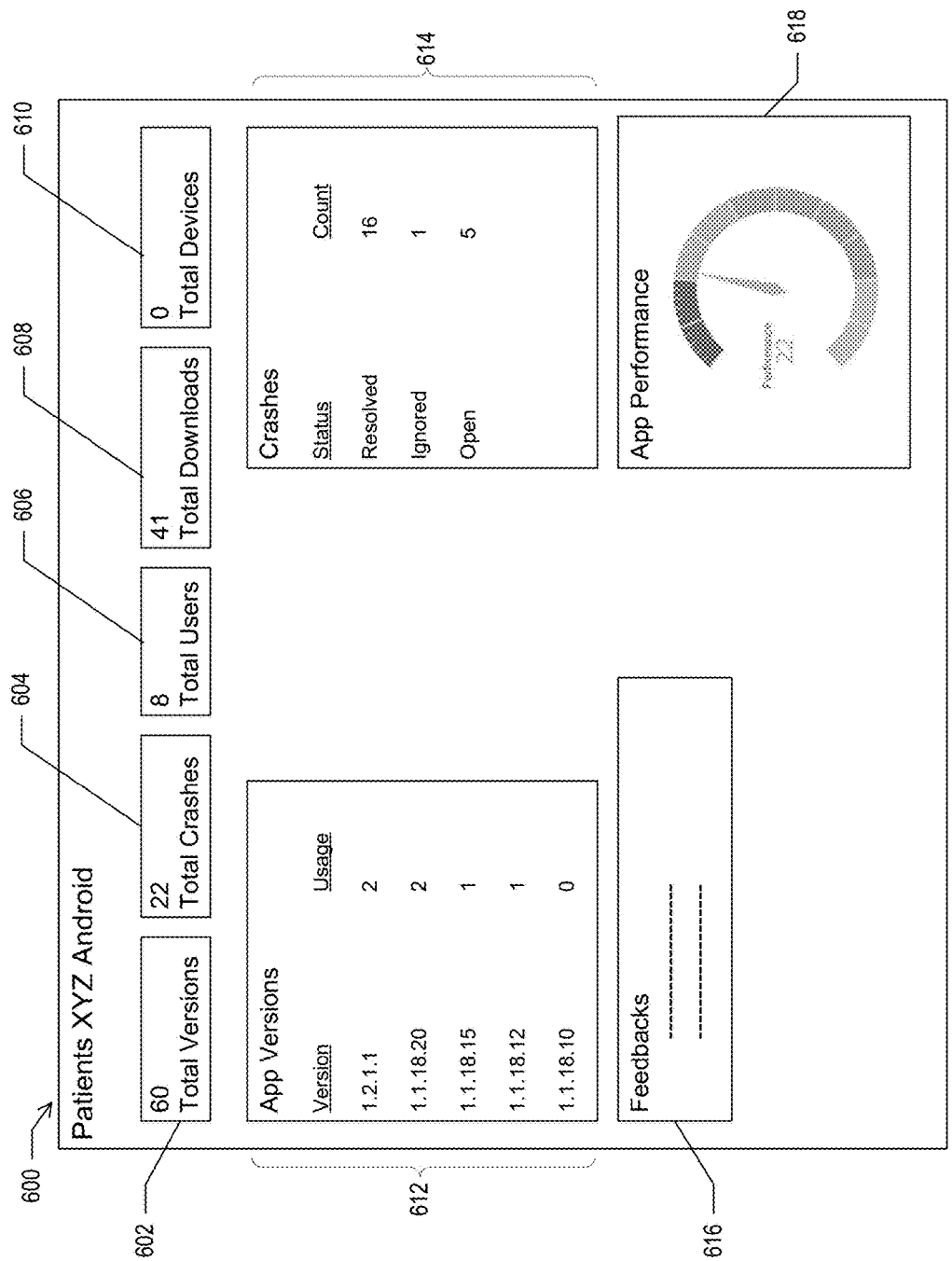

On detecting a user selection, through screen 500, of a particular flavor for which to view more information, the dashboard 104 may present a screen 600 as shown in the example of FIG. 6. In this example, the screen 600 includes elements to present information regarding the total number of versions 602 of the flavor, the total number of crashes 604 detected for the flavor, the total number of end-users 606 of this flavor, the total number of downloads 608 of this flavor, and the total number of end-user devices 610 where this flavor has been deployed.

The screen 600 may include a list 612 of the various available versions of the flavor, including usage information indicating a number of end-users that currently have each version installed on their end-user device(s). The screen 600 may include a list 614 showing the number of crashes of this flavor that are currently resolved, ignored (e.g., not being addressed), and/or open (e.g., unresolved and being addressed). The screen 600 may include a list 616 showing the various feedbacks received, if any, for the version(s) of this flavor. The screen 600 may also display a performance metric 618 showing the overall performance of this flavor.

Figure 7:
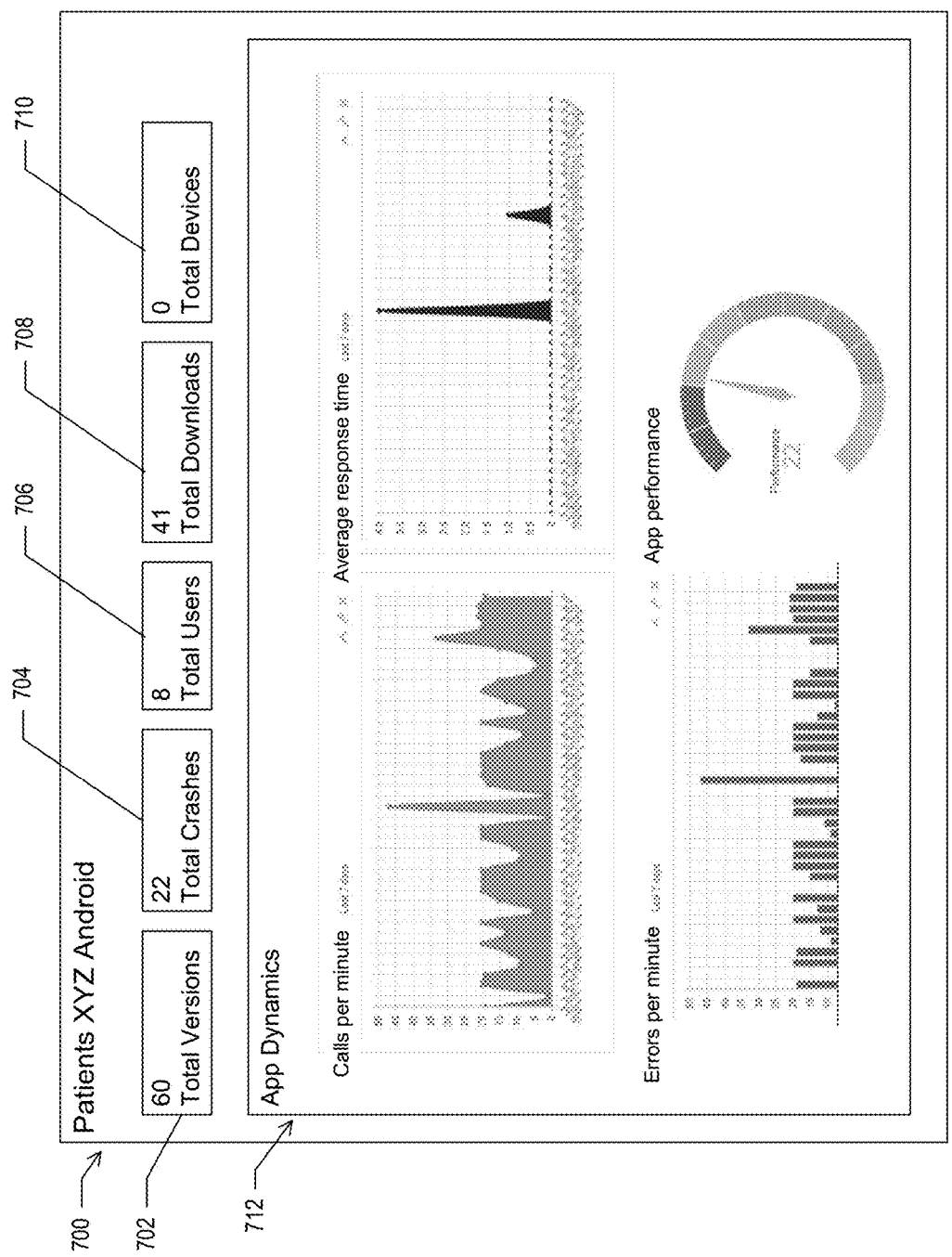

On detecting a user gesture or click on the app performance element of screen 600, the dashboard 104 may present a screen 700 as shown in the example of FIG. 7. As in the example of FIG. 6, the screen 700 may include elements to present information regarding the total number of versions 702 of the flavor, the total number of crashes 704 detected for the flavor, the total number of end-users 706 of this flavor, the total number of downloads 708 of this flavor, and the total number of end-user devices 710 where this flavor has been deployed. The screen 700 may also include a section 712 depicting (e.g., graphically or otherwise), various performance information for the flavor, such as call frequency (e.g., calls per minute), error frequency (e.g., errors per minute), average response time, the overall performance metric, and so forth.

Figure 8:
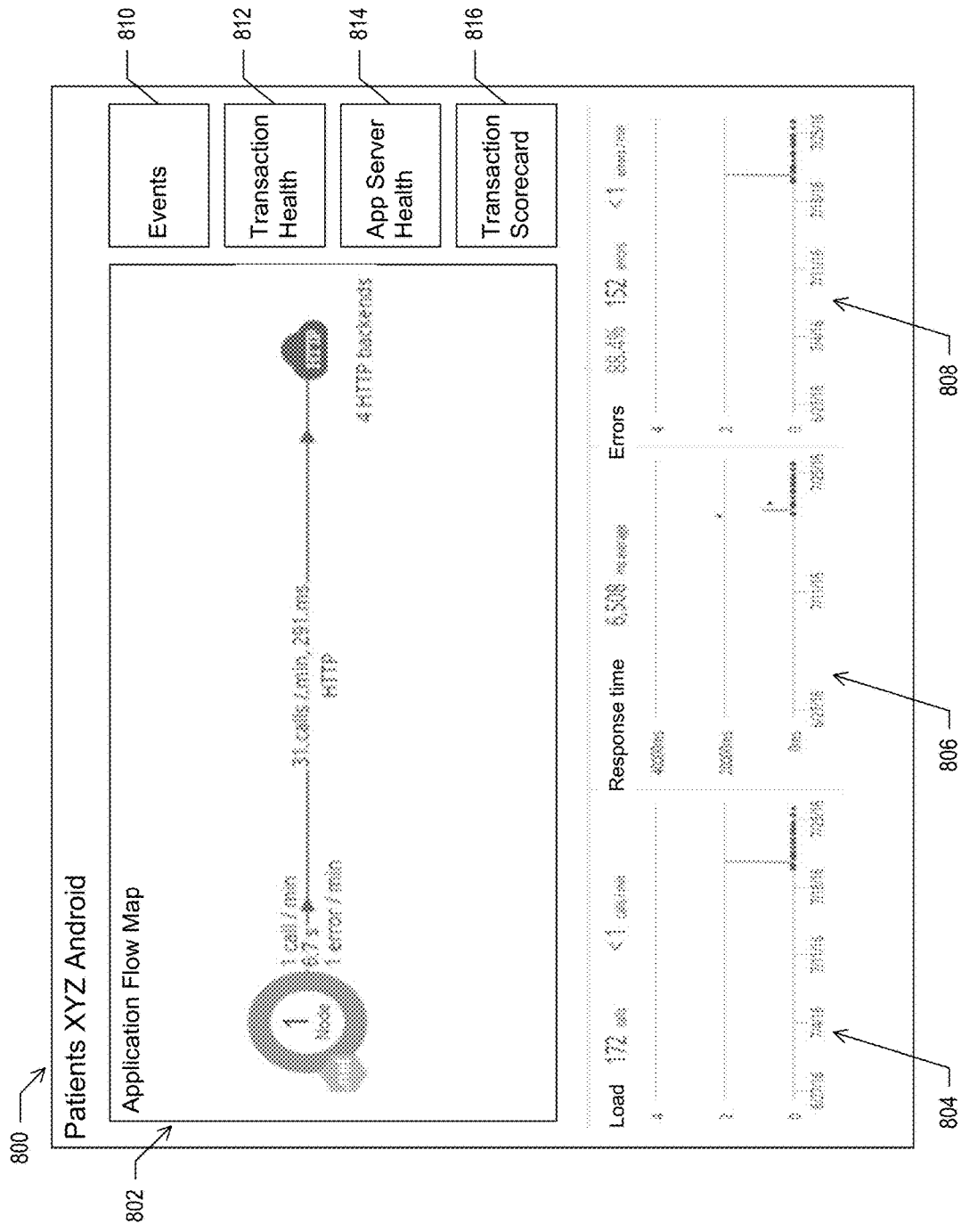

The dashboard 104 may also show other usage data and/or performance data, as shown in FIG. 8. In the example of FIG. 8, the dashboard 104 presents a screen 800 that shows an application flow map 802 for the particular flavor of the app. The application flow map 802 may depict (e.g., graphically or otherwise), the performance of particular aspects of the app, such as a frequency of HTTP calls to HTTP backend services, and/or a frequency of errors in such calls, as shown in the example. The screen 800 may also include graphs 804, 806, and 808 respectively showing the load, response time, and errors exhibited by the app.

The screen 800 may also include sections showing events 810, transaction health 812, app server health 814, and transaction scorecard 816. Events 810 may show a list of events detected for the app in a selected time range, such as crashes, reported bugs, other failures, feedback instances, and so forth.

Figure 9:
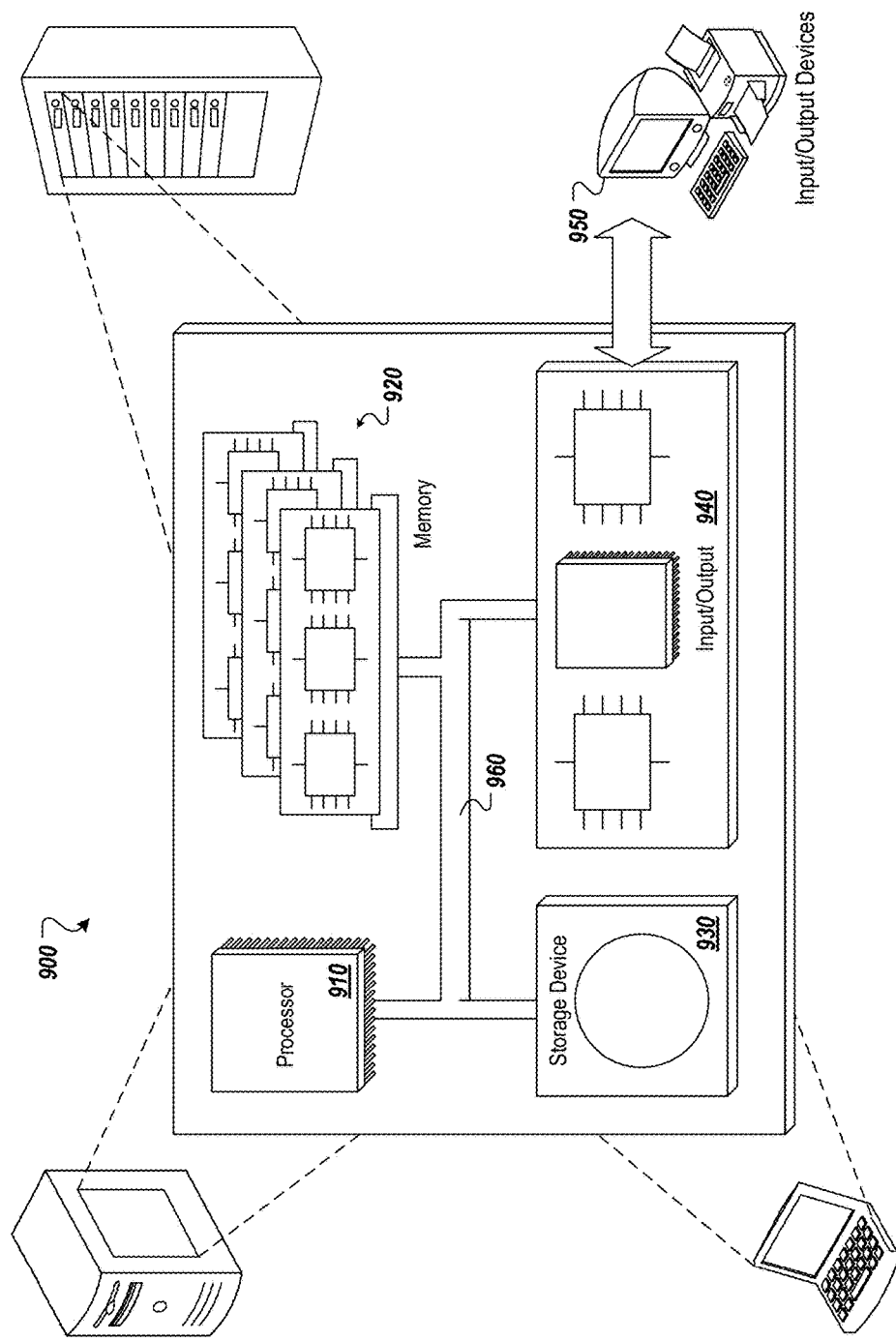
FIG. 9 depicts an example computing system, according to implementations of the present disclosure.

FIG. 9 depicts an example computing system, according to implementations of the present disclosure. The system 900 may be used for any of the operations described with respect to the various implementations discussed herein. For example, the system 900 may be included, at least in part, in the various computing device(s) and/or computing system(s) described herein. The system 900 may include one or more processors 910, a memory 920, one or more storage devices 930, and one or more input/output (I/O) devices 950 controllable through one or more I/O interfaces 940. The various components 910, 920, 930, 940, or 950 may be interconnected through at least one system bus 960, which may enable the transfer of data between the various modules and components of the system 900.

The processor(s) 910 may be configured to process instructions for execution within the system 900. The processor(s) 910 may include single-threaded processor(s), multi-threaded processor(s), or both. The processor(s) 910 may be configured to process instructions stored in the memory 920 or on the storage device(s) 930. The processor(s) 910 may include hardware-based processor(s) each including one or more cores. The processor(s) 910 may include general purpose processor(s), special purpose processor(s), or both.

The memory 920 may store information within the system 900. In some implementations, the memory 920 includes one or more computer-readable media. The memory 920 may include any number of volatile memory units, any number of non-volatile memory units, or both volatile and non-volatile memory units. The memory 920 may include read-only memory, random access memory, or both. In some examples, the memory 920 may be employed as active or physical memory by one or more executing software modules.

The storage device(s) 930 may be configured to provide (e.g., persistent) mass storage for the system 900. In some implementations, the storage device(s) 930 may include one or more computer-readable media. For example, the storage device(s) 930 may include a floppy disk device, a hard disk device, an optical disk device, or a tape device. The storage device(s) 930 may include read-only memory, random access memory, or both. The storage device(s) 930 may include one or more of an internal hard drive, an external hard drive, or a removable drive.

One or both of the memory 920 or the storage device(s) 930 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 900. In some implementations, the CRSM may include a data store that provides storage of computer-readable instructions or other information in a non-transitory format. The CRSM may be incorporated into the system 900 or may be external with respect to the system 900. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 910 and the memory 920 may be supplemented by, or incorporated into, one or more application-specific integrated circuits (ASICs).

The system 900 may include one or more I/O devices 950. The I/O device(s) 950 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 950 may also include one or more output devices such as a display, LED(s), an audio output device (e.g., a speaker), a printer, a haptic output device, and so forth. The I/O device(s) 950 may be physically incorporated in one or more computing devices of the system 900, or may be external with respect to one or more computing devices of the system 900.

The system 900 may include one or more I/O interfaces 940 to enable components or modules of the system 900 to control, interface with, or otherwise communicate with the I/O device(s) 950. The I/O interface(s) 940 may enable information to be transferred in or out of the system 900, or between components of the system 900, through serial communication, parallel communication, or other types of communication. For example, the I/O interface(s) 940 may comply with a version of the RS-232 standard for serial ports, or with a version of the IEEE 1284 standard for parallel ports. As another example, the I/O interface(s) 940 may be configured to provide a connection over Universal Serial Bus (USB) or Ethernet. In some examples, the I/O interface(s) 940 may be configured to provide a serial connection that is compliant with a version of the IEEE 1394 standard.

The I/O interface(s) 940 may also include one or more network interfaces that enable communications between computing devices in the system 900, or between the system 900 and other network-connected computing systems. The network interface(s) may include one or more network interface controllers (NICs) or other types of transceiver devices configured to send and receive communications over one or more networks using any network protocol.

Computing devices of the system 900 may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 900 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks.

However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input. In some instances, input and/or output may be received and/or provided through an augmented reality and/or virtual reality system.

Implementations may be realized in a computing system that includes a back end component, e.g., as a data server, or that includes a middleware component, e.g., an application server, or that includes a front end component, e.g., a client computer having a graphical user interface or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method performed by at least one processor, the method comprising:
    receiving, by the at least one processor, from a deployment manager, an indication of an application to be managed through an integrated application management platform that manages a plurality of applications, wherein the integrated application management platform manages a plurality of flavors for each of the applications and a plurality of versions for each of the flavors, and wherein each of the plurality of flavors of the application is particularly configured to execute on a respective operating system (OS);
    sending, by the at least one processor, an instruction from the integrated application management platform to instruct the deployment manager to provide the application for deployment to one or more end-user computing devices;
    receiving, by the at least one processor, through the integrated application management platform, deployment data from the deployment manager, the deployment data describing the deployment of the application to at least one of the one or more end-user computing devices;
    receiving, by the at least one processor, through the integrated application management platform, usage data generated on the one or more end-user computing devices, the usage data describing usage of the application executing on the one or more end-user computing devices including one or more features of the application accessed during its execution on the end-user computing devices and one or more navigation paths followed to access the one or more features;
    receiving, by the at least one processor, through the integrated application management platform, performance data generated on the one or more end-user computing devices, the performance data describing performance of the application executing on the one or more end-user computing devices; and
    presenting, by the at least one processor, in a dashboard of the integrated application management platform, an integrated display of: i) the deployment data including a number of deployments, to the one or more end-user computing devices, of each version and each flavor of the application, ii) the usage data including the one or more features of the application accessed during its execution on the end-user computing devices and the one or more navigation paths followed to access the one or more features, and iii) the performance data received regarding the application.

2. The method of claim 1, wherein:
the plurality of applications includes one or more mobile applications; and
the one or more end-user computing devices include one or more portable computing devices.

3. The method of claim 1, further comprising:
receiving, by the at least one processor, through the integrated application management platform, feedback information generated on at least one of the one or more end-user computing devices, the feedback information including end-user feedback regarding the application; and
presenting, by the at least one processor, the feedback information in the dashboard.

4. The method of claim 3, further comprising:
sending, by the at least one processor, at least a portion of the feedback information from the integrated application management platform to instruct a service management tool to add an issue ticket to track actions to address the end-user feedback.

5. The method of claim 1, further comprising:
receiving, by the at least one processor, through the integrated application management platform, failure information generated on at least one of the one or more end-user computing devices, the failure information indicating a failure of the application executing on the at least one of one or more end-user computing devices; and
presenting, by the at least one processor, the failure information in the dashboard.

6. The method of claim 5, further comprising:
sending, by the at least one processor, at least a portion of the failure information from the integrated application management platform to instruct a service management tool to add an issue ticket to track actions taken to correct the failure of the application.

7. The method of claim 1, wherein:
the deployment manager indicates that a test build of the application has been generated by a build server in communication with the deployment manager; and
the integrated application management platform instructs the deployment manager to provide the test build of the application for testing on the one or more end-user computing devices.

8. The method of claim 7, further comprising:
receiving, by the at least one processor, from the deployment manager, an indication that testing of the test build is complete; and
sending, by the at least one processor, an instruction from the integrated application management platform to instruct the deployment manager to provide the test build of the application to a product environment for deployment to the one or more end-user computing devices.

9. The method of claim 1, wherein the usage data further describes one or more of:
a number of end-user computing devices to which the application has been deployed; and
a number of executions of the application on the end-user computing devices.

10. The method of claim 1, wherein the performance data describes one or more of:
a call frequency exhibited by the application during its execution on one or more end-user computing devices;
an error frequency exhibited by the application during its execution;
an average response time exhibited by the application during its execution; and
a performance metric indicating an overall performance of the application during its execution.

11. The method of claim 1, wherein the dashboard further presents portfolio management information describing the plurality of flavors and the plurality of version of the application managed through the integrated application management platform.

12. The method of claim 1, wherein one or more of the deployment data, the usage data, and the performance data are received and presented in real time in the dashboard.

13. A system comprising:
at least one processor; and
a memory communicatively coupled to the at least one processor, the memory storing instructions which, when executed by the at least one processor, instruct the at least one processor to perform operations comprising:
receiving, from a deployment manager, an indication of an application to be managed through an integrated application management platform that manages a plurality of applications, wherein the integrated application management platform manages a plurality of flavors for each of the applications and a plurality of versions for each of the flavors, and wherein each of the plurality of flavors of the application is particularly configured to execute on a respective operating system (OS);
sending an instruction from the integrated application management platform to instruct the deployment manager to provide the application for deployment to one or more end-user computing devices;
receiving, through the integrated application management platform, deployment data from the deployment manager, the deployment data describing the deployment of the application to at least one of the one or more end-user computing devices;
receiving, through the integrated application management platform, usage data generated on the one or more end-user computing devices, the usage data describing usage of the application executing on the one or more end-user computing devices including one or more features of the application accessed during its execution on the end-user computing devices and one or more navigation paths followed to access the one or more features;
receiving, through the integrated application management platform, performance data generated on the one or more end-user computing devices, the performance data describing performance of the application executing on the one or more end-user computing devices; and
presenting, in a dashboard of the integrated application management platform, an integrated display of: i) the deployment data including a number of deployments, to the one or more end-user computing devices, of each version and each flavor of the application, ii) the usage data including the one or more features of the application accessed during its execution on the end-user computing devices and the one or more navigation paths followed to access the one or more features, and iii) the performance data received regarding the application.

14. The system of claim 13, wherein the usage data further describes one or more of:
- a number of end-user computing devices to which the application has been deployed;
- a number of executions of the application on the end-user computing devices and.

15. The system of claim 13, wherein the performance data describes one or more of:
- a call frequency exhibited by the application during its execution on one or more end-user computing devices;
- an error frequency exhibited by the application during its execution;
- an average response time exhibited by the application during its execution; and
- a performance metric indicating an overall performance of the application during its execution.

16. The system of claim 13, wherein the dashboard further presents portfolio management information describing the plurality of flavors and the plurality of version of the application managed through the integrated application management platform.

17. The system of claim 13, wherein one or more of the deployment data, the usage data, and the performance data are received and presented in real time in the dashboard.

18. One or more non-transitory computer-readable storage media storing instructions which, when executed by at least one processor, instruct the at least one processor to perform operations comprising:

receiving, from a deployment manager, an indication of an application to be managed through an integrated application management platform that manages a plurality of applications, wherein the integrated application management platform manages a plurality of flavors for each of the applications and a plurality of versions for each of the flavors, and wherein each of the plurality of flavors of the application is particularly configured to execute on a respective operating system (OS);

sending an instruction from the integrated application management platform to instruct the deployment manager to provide the application for deployment to one or more end-user computing devices;

receiving, through the integrated application management platform, deployment data from the deployment manager, the deployment data describing the deployment of the application to at least one of the one or more end-user computing devices;

receiving, through the integrated application management platform, usage data generated on the one or more end-user computing devices, the usage data describing usage of the application executing on the one or more end-user computing devices including one or more features of the application accessed during its execution on the end-user computing devices and one or more navigation paths followed to access the one or more features;

receiving, through the integrated application management platform, performance data generated on the one or more end-user computing devices, the performance data describing performance of the application executing on the one or more end-user computing devices; and presenting, in a dashboard of the integrated application management platform, an integrated display of: i) the deployment data including a number of deployments, to the one or more end-user computing devices, of each version and each flavor of the application, ii) the usage data including the one or more features of the application accessed during its execution on the end-user computing devices and the one or more navigation paths followed to access the one or more features, and iii) the performance data received regarding the application.

* * * * *

UNITED STATES PATENT AND TRADEMARK OFFICE
CERTIFICATE OF CORRECTION

PATENT NO. : 10,346,158 B2
APPLICATION NO. : 15/469015
DATED : July 9, 2019
INVENTOR(S) : Apratim Ghosh and Ramkumar Kothandaraman It is certified that error appears in the above-identified patent and that said Letters Patent is hereby corrected as shown below:

In the Claims

Column 19, Line 4, Claim 14, delete "deployed;" and insert -- deployed; and --;

Column 19, Line 6, Claim 14, delete "devices and." and insert -- devices. --.

Signed and Sealed this
Fifth Day of May, 2020

Andrei Iancu
*Director of the United States Patent and Trademark Office*